United States Patent [19]

Smyth

[11] Patent Number: 4,551,802
[45] Date of Patent: Nov. 5, 1985

[54] AUTOMATIC TRANSMISSION CONTROL METHOD

[75] Inventor: Robert R. Smyth, Bloomfield Hills, Mich.

[73] Assignee: Eaton Corporation, Cleveland, Ohio

[21] Appl. No.: 442,474

[22] Filed: Nov. 17, 1982

[51] Int. Cl.⁴ .................. B60K 41/08; G06F 15/20
[52] U.S. Cl. ................................. 364/424.1; 74/866
[58] Field of Search ...................... 364/424.1; 74/866

[56] References Cited

U.S. PATENT DOCUMENTS

| | | | |
|---|---|---|---|
| 3,776,048 | 12/1973 | Enomoto et al. | 74/866 |
| 3,942,393 | 3/1976 | Förster et al. | 74/866 |
| 3,979,720 | 8/1976 | Iijima | 74/866 |
| 4,038,889 | 8/1977 | Lindow et al. | 74/866 |
| 4,039,061 | 8/1977 | Pruvot et al. | 74/866 X |
| 4,073,203 | 2/1978 | Wurst et al. | 74/866 |
| 4,208,929 | 6/1980 | Heino et al. | 74/866 X |
| 4,226,295 | 10/1980 | Rembold et al. | 74/866 X |
| 4,285,252 | 8/1981 | Yamaki et al. | 74/866 |
| 4,338,666 | 7/1982 | Suzuki et al. | 364/424.1 |
| 4,361,060 | 11/1982 | Smyth | 74/866 |
| 4,474,081 | 10/1984 | Kinugasa et al. | 74/866 |

FOREIGN PATENT DOCUMENTS

| | | | |
|---|---|---|---|
| 1530825 | 7/1969 | Fed. Rep. of Germany | 74/866 |
| 3144845 | 12/1982 | Fed. Rep. of Germany | 74/866 |
| 56-147949 | 11/1981 | Japan | 74/866 |
| 1498510 | 1/1978 | United Kingdom | 74/866 |
| 2102086 | 1/1983 | United Kingdom | 364/424.1 |

*Primary Examiner*—Felix D. Gruber
*Attorney, Agent, or Firm*—C. H. Grace; H. D. Gordon

[57] ABSTRACT

An improved control method and control system for an automatic change gear transmission (10) driven by a throttle controlled engine (12) is provided. The control system includes a processing unit (30) for receiving inputs indicating at least throttle position (18) and engine speed (20) and for processing these inputs in accordance with a program to determine the correct engaged gear ratio and for issuing command signals to a transmission shifting mechanism (26). The processing unit includes logic rules to determine conditions of operator selected stable operating conditions and to lower the engine speeds at which upshifts are commanded in response to such determination.

22 Claims, 3 Drawing Figures

AUTOMATIC TRANSMISSION CONTROL METHOD

BACKGROUND OF THE INVENTION

1. Field of the Invention

This invention relates to automatic power transmissions providing a plurality of gear reduction ratios, such as automatic mechanical transmissions, and, in particular, to control systems and methods therefor. More particularly, the present invention relates to control systems and methods for automatic transmissions wherein gear selection and shift decisions are made and executed based upon measured and/or calculated parameters such as vehicle and/or engine speed, throttle position, rate of change of throttle position, rate of change of vehicle and/or engine speed and the like.

2. Description of the Prior Art

The use of automatic transmissions of both the automatic mechanical type utilizing positive clutches and of the planetary gear type utilizing frictional clutches is well known in the prior art as are control systems therefor. Electronic control systems for automatic transmissions wherein gear selection and shift decisions are made based upon certain measured and/or calculated parameters such as vehicle speed, engine speed, rate of change of vehicle speed, rate of change of engine speed, throttle position, rate of change of throttle position, full depression of the throttle (i.e. "kickdown"), acutation of the braking mechanism, currently engaged gear ratio, and the like are known in the prior art. Examples of such automatic transmission control systems for vehicles may be seen by reference to my allowed copending U.S. patent application Ser. No. 190,512 filed Jan. 24, 1978 and entitled Mechanical Automatic Transmission, now U.S. Pat. No. 4,361,060 issued Nov. 30, 1982, hereby incorporated by reference, and by reference to U.S. Pat. Nos. 4,073,203; 4,253,348; 4,038,889; 4,226,295; 3,776,048; 4,208,929; 4,039,061; 3,974,720 and 3,942,393, all hereby incorporated by reference.

While the above referenced automatic transmission control systems, and similar systems, are effective to control an automatic transmission by selecting a desired gear ratio which will tend to optimize the fuel economy and/or performance of the vehicle in view of the sensed parameters and then commanding a shift into the selected gear ratio, such control systems were not totally acceptable as the predetermined programs utilized to generate a shift pattern, or patterns, (also commonly referred to as a shift point profile), could not recognize operator selected stable operating conditions of the vehicle and modify the shift patterns generated by the program in response to sensed operator selected stable operating conditions to provide an optimal compromise of fuel efficiency operation and desirable vehicle performance operation.

SUMMARY OF THE INVENTION

In accordance with the present invention, the drawbacks of the prior art have been overcome or minimized by providing a control system, preferably an electronic control system, and control method, for automatic transmissions, such as automatic mechanical transmissions, wherein gear selection and shift decisions are made and executed based upon measured and/or calculated parameters including engine speed, preferably a calculated engine speed, and throttle position and/or rate of change of throttle position and wherein the predetermined program by which shift patterns are provided will recognize operator selected stable operating conditions and modify the generated shift patterns accordingly to provide an optimal combination of fuel efficient operation and vehicle performance during such stable operating conditions.

The above is accomplished by providing a transmission control method for a control system including a central processing unit generating shift patterns based upon sensed or calculated engine speed and throttle position and wherein the shift patterns, at least the shift line at which upshifts are commanded, is modified by lowering the engine speed at which upshifts are commanded in response to the processing unit sensing that the operator desires stable vehicle operating conditions. Applicant has determined that the maintenance by the vehicle operator of the throttle control at no greater than a predetermined throttle opening, such as no more than 85 percent of maximum throttle opening and/or an average absolute value of rate of change in throttle position below a predetermined rate, such as below an average of 8 percent/second increase, for a predetermined time interval is an indication of operator selection of, and satisfaction with, stable vehicle operating conditions, such as maintenance of a substantially constant vehicle speed such as might be expected in an over the road operation and/or steady stable traffic conditions as opposed to a constantly changing speed which might be expected in a stop and go traffic situation, which stable operating conditions may be assumed will continue for at least a period of time. In such operator selected stable operating conditions, upshifts may be commanded at a lower engine speed than would be the case in a stop and go type operation, which will provide operation at closer to optimal fuel usage without causing an objectionable large number of shifts (i.e. objectionably frequent shifting) or an objectionable loss of acceleration. Additionally, the vehicle may be maintained at closer to optimal fuel efficiency operation by commanding downshifts at a greater engine speed than would be desirable under dynamically changing vehicle conditions. Accordingly, by providing a central processing unit with means to sense operator selected stable vehicle operating conditions and a predetermined program which will modify the shift patterns by lowering the engine speeds at which upshifts are commanded, and possibly by increasing the engine speeds at which downshifts are commanded, the shift patterns generated by the central processing unit command shifts allowing the vehicle to operate at closer to optimal fuel usage while not objectionalby decreasing vehicle performance.

Accordingly, it is an object of the present invention to provide a new and improved control method for a control system for automatic transmissions which involves sensing operator selected stable operating conditions and modifying thereby the shift patterns generated thereby accordingly.

These and other objects and advantages of the present invention will become apparent from a reading of the description of the preferred embodiment taken in connection with the attached drawings.

DESCRIPTION OF THE PREFERRED EMBODIMENT

Figure 1:
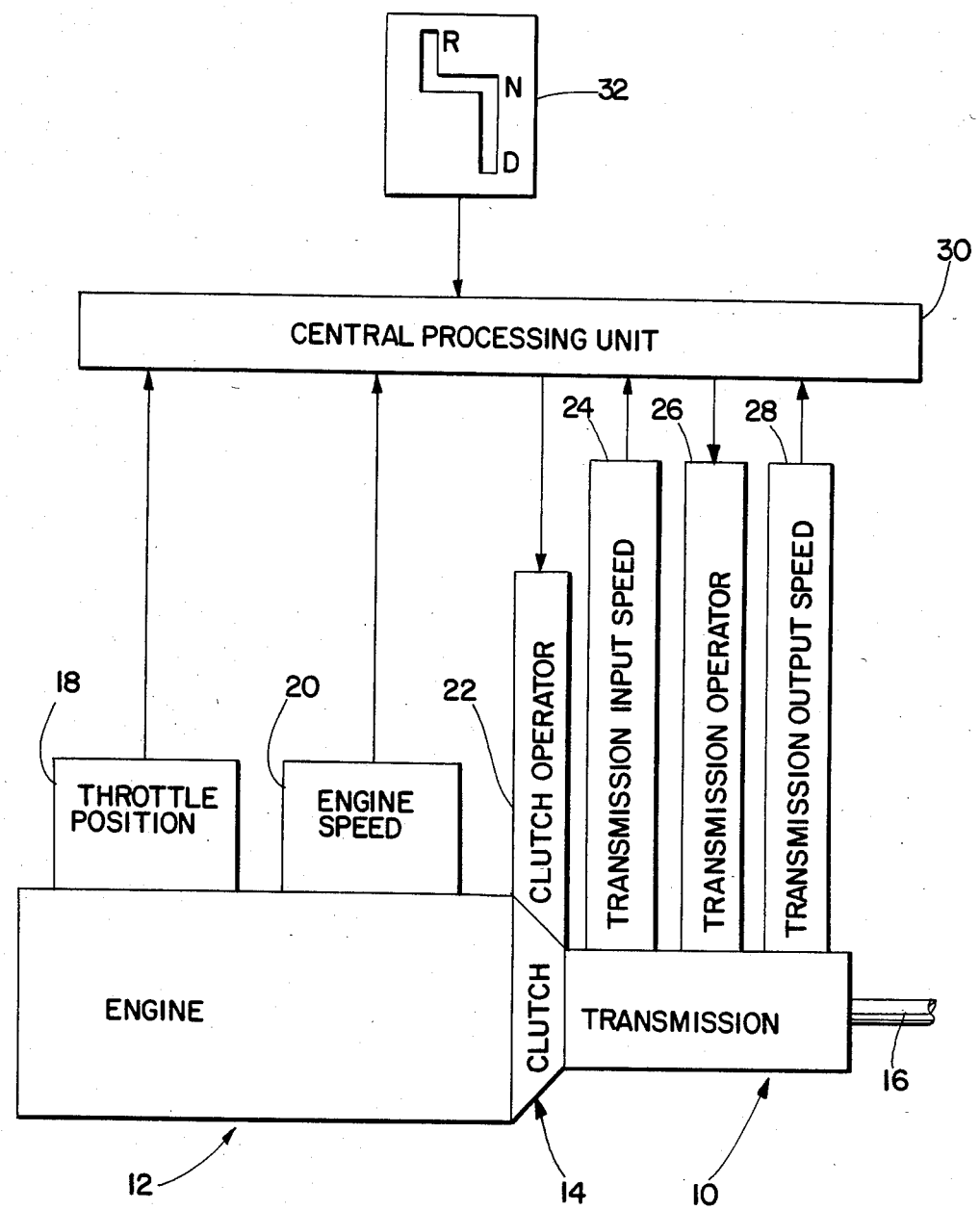
FIG. 1 is a schematic illustration of the components and interconnections of the automatic mechanical transmission control system of the present invention.

FIG. 1 schematically illustrates an automatic multi-speed change gear transmission 10 driven by a throttle controlled engine 12, such as well known diesel engine, through a master clutch 14. The output of the automatic transmission 10 is output shaft 16 which is adopted for driving connnection to an appropriate vehicle component such as the differential of a drive axle, a transfer case or the like as is well known in the prior art. The above mentioned power train components are acted upon and monitored by several devices each of which will be discussed in greater detail. These devices include a throttle position or throttle opening monitor assembly 18 which senses the position of the operator controlled vehicle throttle or other fuel throttling device, an engine speed sensor 20 which senses the rotational speed of the engine, a clutch operator 22 which engages and disengages clutch 14, a transmission input shaft speed sensor 24, a transmission operator 26 which is effective to shift the transmission 10 into a selected gear ratio, and a transmission output shaft speed sensor 28.

The above mentioned devices supply information to or accept commands from a central processing unit 30. The central processing unit 30 may include analogue and/or digital electronic calculation and logic circuitry, the specific configuration and structure of which forms no part of the present invention. The central processing unit also receives information from a shift control assembly 32 by which the operator may select a reverse (R), neutral (N) or forward drive (D) mode of operation of the vehicle. An electrical power source (not shown) and/or source of pressurized fluid (not shown) provides electrical and/or pneumatic power to the various sensing, operating and/or processing units. Drive train components and controls therefor of the type described above are known in the prior art and may be appreciated in greater detail by reference to my above mentioned allowed copending U.S. patent application Ser. No. 190,512 filed Jan. 24, 1978, now U.S. Pat. No. 4,361,060 and/or U.S. Pat. Nos. 3,776,048; 4,038,889 and 4,226,295.

As is known, the central processing unit 30 receives direct inputs from sensor 18 indicating the present throttle position, from sensor 20 indicating the present engine speed, from sensor 24 indicating the present transmission input shaft speed, from sensor 28 indicating the present transmission output shaft speed and from sensor 32 indicating the mode of operation selected by the vehicle operator or driver. In addition to these direct inputs, the central processing unit 30 may be provided with circuitry whereby the signal from sensor 18 may be differentiated to provide a calculated signal indicative of the rate of change of throttle position, a circuit for differentiating the input signal from sensor 20 to provide a calculated signal indicative of the rate of acceleration of the engine, means to compare the input signals from sensor 24 and 28 to calculate a current engaged gear ratio, circuit means to compare the current engaged gear ratio with the signal from sensor 28 to provide a calculated engine speed and means to sense full depression or release of the throttle. The central processing unit also comprises a memory means for storing certain input and or calculated information and means for clearing the memory means upon the occurrence of a predetermined event. Additionally, the central processing unit includes a timing device, such as a capacitor which decays at a known rate, which may be reset upon the occurrence of a predetermined event to measure a predetermined time interval. Specific circuitry for providing the above mentioned functions is known in the prior art and an example thereof may be seen by reference to my above mentioned allowed copending U.S. patent application Ser. No. 190,512 filed Jan. 24, 1978, now U.S. Pat. No. 4,361,060.

The memory means incorporated the central processing unit 30 may store information such as the direction of the last shift, position of the throttle, rate of change of throttle position, vehicle speed or the like. The memory means may be reset upon the occurrence of a specified event such as engine or vehicle speed exceeding a predetermined limit, full application of the throttle, operator throttle setting exceeding or predetermined limit, the occurrence of a gear change, etc.

Sensors 18, 20, 24 and 28 may be of any known type or construction for generating analog or digital signals proportional to the parameter monitored thereby. Similarly, operators 22 and 26 may be of any known electrical, pneumatic or electro-pneumatic type for executing operations in response to command signals from processing unit 30.

A purpose of the central processing unit is to select, in accordance with a program and current or stored parameters, the optimal gear ratio at which the transmission should be operating and if necessary to command a gear change, or shift, into the selected optimal gear ratio based upon the current and/or stored information.

Figure 2:
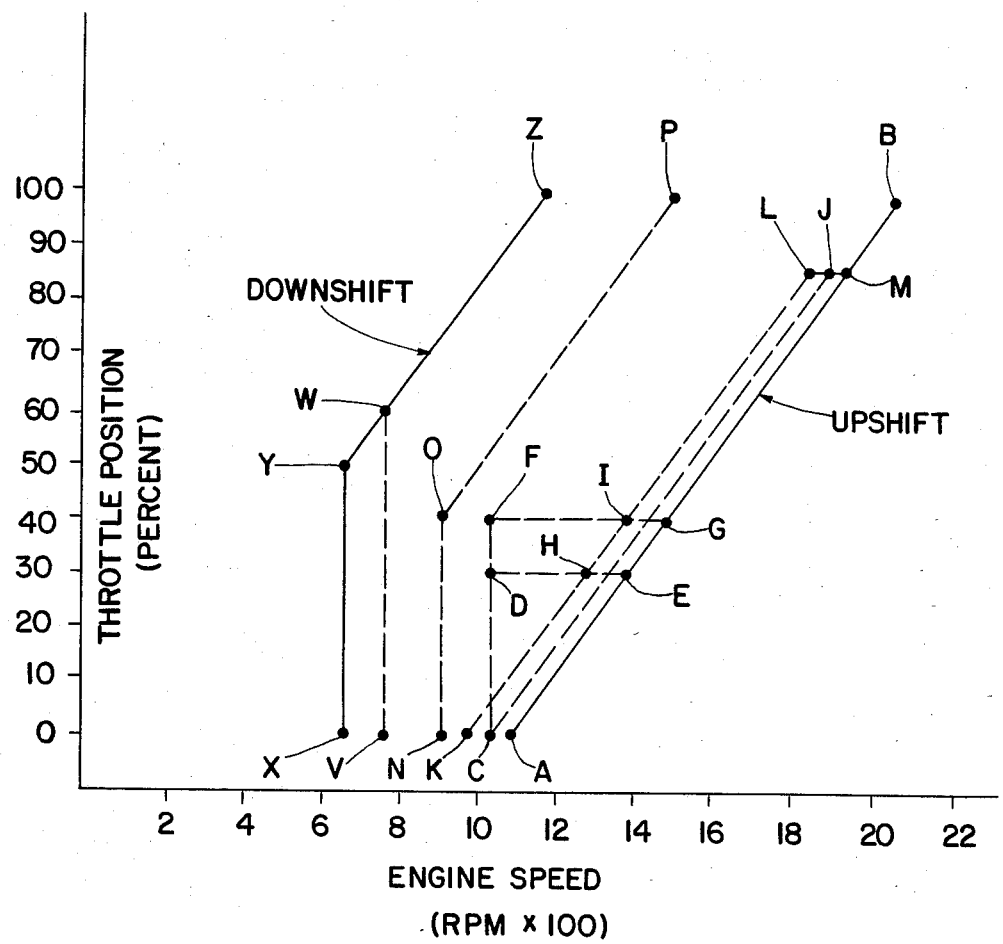
FIG. 2 is a graph of engine speed versus throttle position illustrating the shift patterns, or shift point profiles, generated by the automatic transmission control system of the present invention.

The primary purpose of the central processing unit program or logic rules is to generate a shift pattern, or shift point profile, as is seen in FIG. 2. The shift point profile generated by the central processing unit will determine if the transmission should remain in the currently engaged gear ratio, should be upshifted to the next highest gear ratio or should be downshifted to the next lower gear ratio. The shift point profiles are determined by a predetermined program acting upon current or stored information and are selected to provide a compromise between operation at the most fuel efficient possible gear ratio and operation in a gear ratio to provide optimal performance characteristics of the vehicle. The shift point profiles are graphically illustrated in FIG. 2 as a function of both throttle position, expressed as a percentage of maximum throttling position, and engine speed. The engine speed may be directly sensed or, preferably, is calculated engine speed which will not vary during a shift transient as is known in the prior art. The shift profile includes an upshift line A-B and a downshift line X-Y-Z. Briefly, for operating conditions within the space bounded by downshift line X-Y-Z and upshift line A-B no gear change is required, for operating conditions at or to the right of upshift line A-B an upshift to the next highest gear ratio is required and for operating conditions within the area at or to the left of downshift line X-Y-Z a downshift to the next lowest gear ratio is required. It is understood, of course, that a single shift point profile may be utilized for all gear ratios of a transmission or a separate shift profile may be generated for each currently engaged gear ratio. Generally, the greater the difference in ratio splits between the gears, the greater the desirability of separate shift point profiles for each current engaged gear ratio.

It is understood that other sensed or calculated monitored speeds, such as input shaft speed, output shaft speed, vehicle speed or the like may be substituted for engine speed in the shift point profiles illustrated in FIG. 2.

As is known, for a specified internal combustion engine, such as a turbocharged diesel engine utilized in a heavy duty truck, for each throttle position there is an engine speed (usually expressed in revolutions per minute or "RPM"), or range of engine speeds at which the engine is most fuel efficient. This optimal fuel efficiency operating condition is represented by the line N-O-P. The speed at which an engine is rotating is determined by the vehicle speed and engaged drive line gear ratio, only the transmission ratio of which is usually selectively variable, in set increments, in the drive line schematically illustrated in FIG. 1. Accordingly, for maximizing fuel efficiency, the transmission should be shifted as quickly and as often as possible to maintain the engine as close as possible to the maximum fuel efficiency line N-O-P. This can be accomplished by placing the upshift line A-B and the downshift line X-Y-Z as closely as possible, while maintaining at least a minimum hysterisis to prevent speed related hunting for proper gear ratio, to the maximum fuel efficiency line N-O-P.

Another concern in selecting desired gear ratio, that is when generating shift point profiles is vehicle performance. Vehicle performance may be defined as the ability to accelerate at at least a given rate and avoidance of unduly frequent up and down shifts, i.e. nuisance shifting. Generally, optimized vehicle performance requires that the upshift and downshift lines be spaced relatively distant from the optimum fuel efficiency line N-O-P.

It may be appreciated that the maximizing of fuel economy and maximizing of vehicle efficiency are often in conflict. The placement of upshift and donshift lines in a shift point profile is thus an attempt to achieve an optimal compromise between fuel efficiency and vehicle performance. As the relative importance of fuel efficiency and vehicle performance varies under different operating conditions, as determined by central processing unit 30 acting under current and/or stored information in accordance with a program, the upshift and downshift lines are preferably not static but are dynamic. Dynamically moving shift lines are known, and are discussed in greater detail in my allowed, copending U.S. patent application Ser. No. 190,512 filed Jan. 24, 1978, now U.S. Pat. No. 4,361,060. Typically, the shift lines are moved in response to current and/or stored information such as direction of last shift, acceleration of the vehicle, acceleration of the engine, rate of change of throttle position, operation of the vehicle brake or the like.

It is important to understand that the shift point profiles are dependent upon the throttle position as well as the engine speed. Other than selecting a reverse, neutral or forward drive mode of operation of the vehicle by manipulation of selector 32, the operator's only input to the transmission is his manipulation of the throttle pedal or other fuel control as the case may be. Accordingly, by setting shift profiles and modifying same in partial response to throttle position the operator's desires are accounted for by the central processing unit when deciding the optimal gear ratio at which the transmission is to operate.

The term throttle as used herein means the device or mechanism by which the vehicle operator indicates the amount of fuel he desires to supply to the engine. Usually, the operator can select any amount of fuel varying from zero percent (closed throttle) to 100 percent (full open throttle) of maximum fuel supply. The actual device controlled may be a carburetor, a fuel injector and fuel injection rack or the like. Throttle position as used herein means the operator's selection of desired fuel supply to the engine expressed as a percentage of maximum fuel supply.

Of the inputs to the central control unit 30, perhaps the or one of the most important is throttle position as that is the means by which the vehicle operator communicates his desires to the drive train, which desires are based upon his sensing of current and expected vehicle operating conditions. Preferably, the throttle position sensor 18 will provide a signal indicating closed throttle (zero percent throttle position), full open throttle (100 percent throttle position) and any throttle position therebetween (for example, 50 percent throttle position). Additionally, the central processing unit 30 will preferably have circuitry to provide a signal indicating the rate of change throttle position with respect to time. Such sensors and circuitry is disclosed in my allowed copending U.S. patent applicaton Ser. No. 190,512 filed Jan. 24, 1978, now U.S. Pat. No. 4,361,060.

Preferably, the engine speed is a calculated rather than an actual engine speed, corresponding to the engine speed at drive train lock up conditions, which is determined by multiplying the output shaft speed by the appropriate gear ratio. The use of a calculated rather than an actual engine speed is preferred as actual engine speeds will vary during shift transients and the like.

It has been discovered, that by utilizing the available inputs to the central processing unit 30, an operator selected stable mode of operation of the vehicle may be sensed by the central processing unit and that operation of the drive train may be further optimized by modifying the shift point profiles in accordance with sensing such selection of stable operating conditions. Briefly, operator selected stable operating conditions may be described as those conditions wherein the operator is satisfied with the vehicle's current rate of speed and/or current acceleration and is not demanding a greater rate of acceleration by fully depressing the throttle pedal. Such stable operating conditions typically occur in an over-the-road operating condition wherein the vehicle is operating at a steady speed and may be expected to be satisfactorily operated at this steady speed for a period of time. Stable operation does not occur when relatively rapid acceleration of deceleration is required nor during stop and go traffic conditions. During driver selected stable operations, the vehicle speed will remain relatively constant, relatively slow acceleration is not objectionable and the upshift line of the shift point profile may be shifted leftwardly toward the most optimum fuel efficiency shift points without causing an undesirable large number of shifts of the transmission. Additionally, the downshift line of the shift profile may be shifted rightwardly to achieve a more near optimal fuel efficiency operation without causing an undesirable large number of gear changes.

It has been discovered that such operator selected stable operating conditions can be sensed in a variety of manners by the central processing unit 30 utilizing the available inputs. One method for sensing operator selected relatively stable operating conditions comprises sensing that the throttle position remains at less than a predetermined reference throttle position for a predetermined period of time. It has been found that throttle position remaining at less than 85 percent of full throttle, preferably less than 40 percent of full throttle, for a predetermined period of time is an indication of operator satisfaction of the existing stable operating condition of the vehicle. The period of time is preferably about 20 seconds but might be as great as 30 seconds or as little as ten seconds. It has also been found that an average rate of change in throttle position equaling less than a predetermined rate of change of throttle position for a predetermined period of time is an indication of operator satisfaction and selection of stable vehicle operating conditions. By way of example, it has been found that a rate of change of throttle position less than eight percent/second, preferably less than four percent/second, over a given period of time is an accurate indication of driver selected stable vehicle operation. Stable operating conditions may also be sensed by a combination of throttle position remaining below a predetermined reference throttle position and average rate of change of throttle position remaining below a predetermined rate of throttle position.

By way of example, operator selected stable operation of a vehicle may be sensed by throttle position remaining below 40 percent of full throttle for a period of time of not less than ten to thirty seconds, remaining below 85 percent of full throttle for a period of time not less than ten to thirty seconds, or remaining below 30 percent of full throttle for a period of time not less than ten to thirty seconds. Stable operating conditions may also be sensed by throttle setting remaining below 85 percent of full throttle and rate of change of throttle position remaining below an eight percent/second rate of change for a period of time not less than ten to thirty seconds. Various combinations and modifications of the values set forth in the above examples are possible indication of operator selected stable vehicle operating conditions depending upon the characteristics of the engine, vehicle and transmission and the relative importance assigned to fuel economy and vehicle performance.

Operator selected stable operation of a vehicle may also be sensed by the average absolute value of vehicle speed and/or vehicle acceleration and/or engine speed remaining below a predetermined reference value for predetermined period of time.

It has also been discovered that once sensed, operator selected stable vehicle operating conditions often continue for an extended period of time. An example is over the road operation on a low traffic highway such as might be experienced in late night operation on a freeway.

Various possible modifications to the shift point profile may be seen by reference to FIG. 2. In FIG. 2, the solid lines, upshift line A-B and downshift line X-Y-Z, represent a shift profile generated in accordance with prior art practice, under which practice the shift lines may be dynamically moved in response to various current and/or stored information other than sensed operator selected stable vehicle operation.

In response to said sensed operator selected stable operating conditions, and for so long as said conditions continue to be sensed, i.e. for so long as the throttle position and/or rate of change of throttle position remain at less than predetermined values, the normally generated upshift line A-B may be modified by reducing the engine speed at which an upshift will be commanded in a variety of manners. For example the upshift profile may be modified to follow the line C-F-G-B by which upshifts will be commanded at a considerably lower engine speed for less than 40 percent throttle position. Similarly, the upshift profile may be modified to follow the line C-D-E-B by which upshifts will be commanded at a considerably lower engine speed for less than 30 percent throttle position. Another possible upshift profile is C-D-H-I-G-B wherein the engine speed at which upshifts will be commanded is greatly reduced below 30 percent throttle position and moderately reduced for throttle positions between 30 percent and 40 percent.

Other possible modified upshift profile are C-F-I-L-M-B or K-H-I-L-M-B wherein all upshifts below 85 percent throttle are commanded at a set lower engine speed. A further manner of possible modification of the upshift profile is lowering the engine speeds at which upshifts are commanded to C-J-M-B after a first time period of sensed operator selected stable operating conditions and then continuously or in single step lowering the engine speeds at which upshifts are commanded during or at the end of, respectively, a second time period to K-H-I-L-M-B.

Additionally, the shift profile may be modified by increasing the engine speeds at which downshifts are commanded from X-Y-Z to V-W-Z.

The modification of the upshift line in response to sensed operator selected stable conditions may be reset, that is the time period begun anew and the upshift line restored to A-B, in response to one or more sensed conditions, such as throttle position exceeding a predetermined maximum throttle position such as 85 percent, or throttle position going to zero indicating the operator has removed his foot from the throttle and/or is coasting or the occurrence of a shift. Additionally any one of these events may be utilized to only partially reset the time interval required for sensing stable operating conditions. For example, at the occurrence of a gear change or shift the time interval counter could be reset to five seconds.

As can be appreciated, the possible modifications and permutations of shift profiles in response to sensed driver selected stable vehicle operation are infinite.

Figure 3:
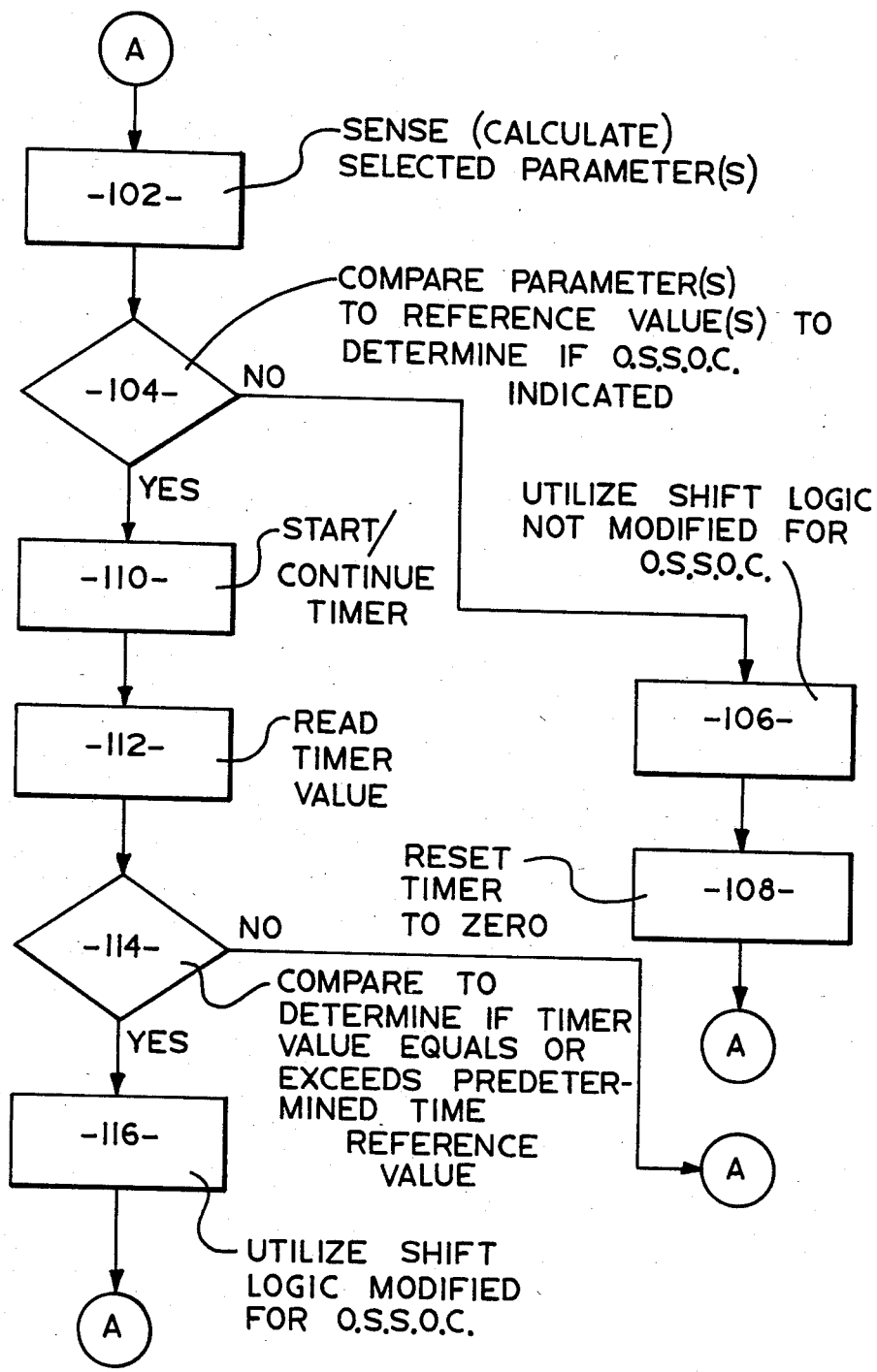
FIG. 3 is a symbolic illustration, in the form of a flow chart, illustrating a preferred manner of practicing the invention.

A symbolic illustration of the present invention, in flow chart format, may be seen by reference to FIG. 3. The procedure or logic cycle begins or starts at point A. A selected parameter is sensed or calculated at block 102. For this example, the parameter is throttle position, expressed as a percentage of full throttle, sensed by sensor 18. At block 104, the sensed throttle position is compared to a predetermined reference value, which in this example is 40%, to determine if operator selected stable operating conditions ("O.S.S.O.C.") are indicated. If such conditions are not indicated, i.e. if sensed throttle position is not less than 40%, the CPU 30 will, as indicated at block 106, utilize shift logic not modified for O.S.S.O.C. (i.e. upshift profile A-B). Additionally, at block 108, the timer will be set to zero and the logic will return to starting point A.

If the comparison at block 104 does indicate O.S.-S.O.C., i.e. if sensed throttle position is less than 40%, at block 110 the timer will be started or allowed to continue, and at block 112 the timer value will be read. The timer value will then, at block 114, be compared to a reference time value, in this example 20 seconds, to determine if the conditions indicating O.S.S.O.C. (see block 104) have existed for at least the predetermined period (i.e. 20 seconds) of time. If the timer value does not yet equal or exceed 20 seconds, the logic will return to starting point A. If the timer value does equal or exceed the 20 second reference value, the CPU 30 will utilize shift logic modified for O.S.S.O.C. In this example, the upshift profile will be modified from A-B to C-F-G-B.

Clutch operator 22 is preferably controlled by the central processing unit 30 and may engage and disengage master clutch 14 as described in my U.S. Pat. No. 4,081,065, hereby incorporated by reference. Transmission 10 may include synchronizing means, such as an accelerator and/or a brake mechanism as described in my U.S. Pat. No. 3,478,851, hereby incorporated by reference. The transmission 10 is preferable, but not necessarily, of the twin countershaft type as is seen in U.S. Pat. No. 3,105,395, hereby incorporated by reference.

Although the present invention has been set forth with a certain degree of particularity, it is understood the various modifications are possible without departing from the spirit and scope of the invention as hereinafter claimed.

I claim:

1. An improved method for controlling an automatic transmission system for devices having a throttle-controlled engine, an operator actuated throttling control means and a transmission having a plurality of gear ratio combinations selectively engageable between a transmission input shaft and a transmission output shaft, said transmission input shaft being operatively connected to said engine, said transmission system comprising, an information processing unit having means for receiving a plurality of input signals including (1) an input signal indicative of the position of said throttle controlling means and (2) an input signal indicative of the rotational speed of said engine, said processing unit including means for processing said input signals in accordance with a program to provide a predetermined gear ratio for a given combination of input signals and for generating output signals whereby said transmission system is operated in accordance with said program, and means associated with said transmission effective to actuate said transmission to effect engagement of one of said gear ratio combinations in response to said output signals from said processing unit, the improved method comprising:

sensing the presence or absence of operator selected stable operation of the device by causing said processing unit to process at least one of said input signals in accordance with predetermined logic rules; and, modifying said program by lowering the engine speed at which an upshift will be commanded in response to said processing unit sensing the presence of operator selected stable operation of the device.

2. The improved method of claim 1 wherein said processing unit senses operator selected stable operation of the device if the throttle position remains at greater than zero percent of maximum throttle position and below a predetermined reference throttle position value for at least a predetermined time interval.

3. The improved method of claim 2 wherein said throttle position predetermined reference value is less than 40 percent of maximum throttle position.

4. The improved method of claim 3 wherein said time interval is at least 30 seconds.

5. The improved method of claim 4 wherein said throttle position predetermined reference value is less than 30 percent of maximum throttle position.

6. The improved method of claim 3 wherein said time interval is at least 20 seconds.

7. The improved method of claim 2 wherein said throttle position predetermined reference value is less than 85 percent of maximum throttle position.

8. The improved method of claim 2 wherein said modifying the program comprises increasing the engine speed at which downshifts are commanded simultaneously with lowering the engine speeds at which upshifts are commanded.

9. The improved method of claim 2, wherein said processing unit includes timing means for measuring a predetermined time interval.

10. The improved method of claim 1 wherein said processing unit senses operator selected stable operation of the device if the throttle position remains at greater than zero percent of maximum throttle position, at less than a predetermined reference throttle position value and if the average rate of change of throttle position remains below a predetermined reference throttle rate of change value for a predetermined time interval.

11. The improved method of claim 10 wherein said predetermined rate of change of throttle position reference value is less than eight percent per second.

12. The improved method of claim 11 wherein said throttle position predetermined reference value is less than 85 percent of maximum throttle position.

13. The improved method of claim 12 wherein said time interval is at least 20 seconds.

14. The improved method of claim 11 wherein said time interval is at least 20 seconds.

15. The improved method of claim 10 wherein said predetermined rate of change of throttle position reference value is less than four percent per second.

16. The improved method of claim 15 wherein said throttle position predetermined reference value is less than 85 percent of maximum throttle position.

17. The improved method of claim 10 wherein said modifying the program comprises increasing the engine speed at which downshifts are commanded simultaneously with lowering the engine speeds at which upshifts are commanded.

18. The improved method of claim 10, wherein said processing unit includes timing means for measuring a predetermined time interval.

19. The improved method of claim 1 wherein said modifying the program comprises increasing the engine speed at which downshifts are commanded simultaneously with lowering the engine speeds at which upshifts are commanded.

20. The improved method of claim 1, wherein said processing unit includes timing means for measuring a predetermined time interval, and said sensing the presence or absence of operator selected stable operation of the device comprises calculating the average absolute rate of change of throttle position with respect to time; comparing said average absolute rate of change of throttle position to a predetermined reference rate of change value, and determining if said average absolute rate of change of throttle position has remained below said predetermined reference value for at least said predetermined time interval.

21. The improved method of claim 20 wherein said modifying the program comprises increasing the engine speed at which downshifts are commanded simultaneously with lowering the engine speeds at which upshifts are commanded.

22. The improved method of claim 1, wherein said processing unit includes timing means for measuring a predetermined time interval.

* * * * *